(12) United States Patent
Walker et al.

(10) Patent No.: US 10,712,448 B2
(45) Date of Patent: Jul. 14, 2020

(54) REAL-TIME CORRELATION OF SENSED POSITION DATA WITH TERRESTRIAL FEATURES

(71) Applicant: Freeport-McMoRan Inc., Phoenix, AZ (US)

(72) Inventors: Mary Amelia Walker, Phoenix, AZ (US); Robert Catron, Phoenix, AZ (US); Brian Vaughan, St. Louis, MO (US); Hung Jung Lu, St. Louis, MO (US)

(73) Assignee: Freeport-McMoRan Inc., Phoenix, AZ (US)

( * ) Notice: Subject to any disclaimer, the term of this patent is extended or adjusted under 35 U.S.C. 154(b) by 91 days.

(21) Appl. No.: 16/167,989

(22) Filed: Oct. 23, 2018

(65) Prior Publication Data

US 2020/0124741 A1  Apr. 23, 2020

(51) Int. Cl.
*G01S 19/27* (2010.01)
*G06N 5/04* (2006.01)
*G01S 19/07* (2010.01)
*G06F 17/15* (2006.01)

(52) U.S. Cl.
CPC .............. *G01S 19/27* (2013.01); *G01S 19/07* (2013.01); *G06F 17/15* (2013.01); *G06N 5/046* (2013.01)

(58) Field of Classification Search
None
See application file for complete search history.

(56) References Cited

U.S. PATENT DOCUMENTS

| 5,123,087 A | 6/1992 | Newell et al. | |
| 5,848,374 A * | 12/1998 | Wakabayashi | G01C 15/00 701/455 |
| 9,183,438 B1 * | 11/2015 | Dhein | G06T 11/60 |
| 2008/0004789 A1 | 1/2008 | Horvitz et al. | |
| 2014/0278055 A1 * | 9/2014 | Wang | G01C 21/32 701/409 |
| 2017/0371837 A1 | 12/2017 | Walker et al. | |

OTHER PUBLICATIONS

PCT International Search Report and Written Opinion, dated Jan. 8, 2019, corresponding to PCT/US2018/057356, 12 pages.

* cited by examiner

*Primary Examiner* — Abdhesh K Jha
(74) *Attorney, Agent, or Firm* — Fennemore Craig, P.C.

(57) ABSTRACT

Methods and systems of correlating sensed position data with terrestrial features receive sensed position data from a position sensing system operatively associated with a moveable object; select a reduced set of snap point candidates from terrestrial data based on a sensed position point; choose a best snap point candidate from among the reduced set of snap point candidates based on a plurality of predictive variables and corresponding weighting factors for each snap point candidate in the reduced set of snap point candidates; and snap the sensed position point to the best snap point candidate to produce a snapped position point. The selecting, choosing, and snapping processes are performed in substantially real time so that the systems and methods correlate the sensed position data from the moveable object with terrestrial features in substantially real time.

23 Claims, 12 Drawing Sheets

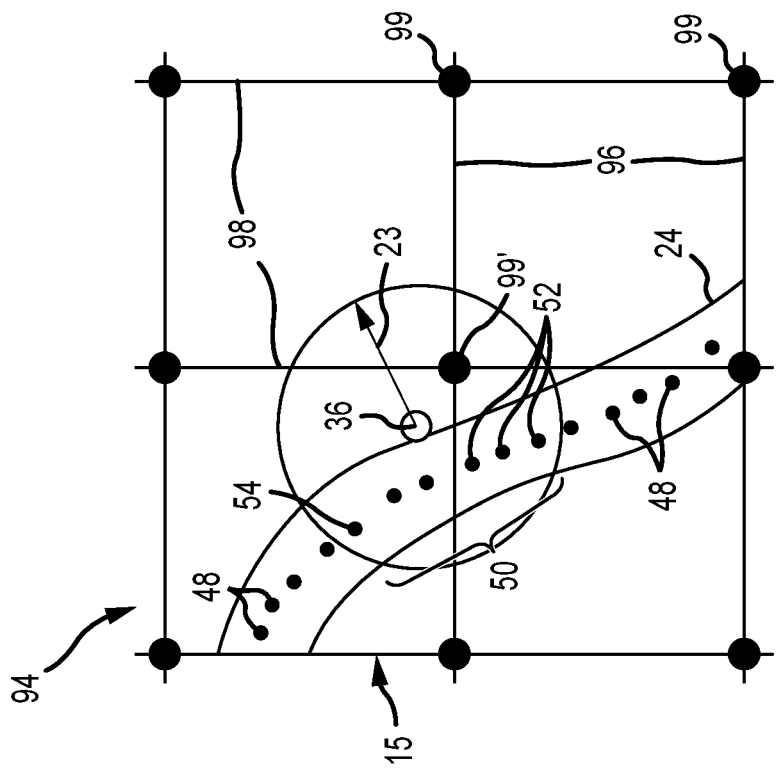
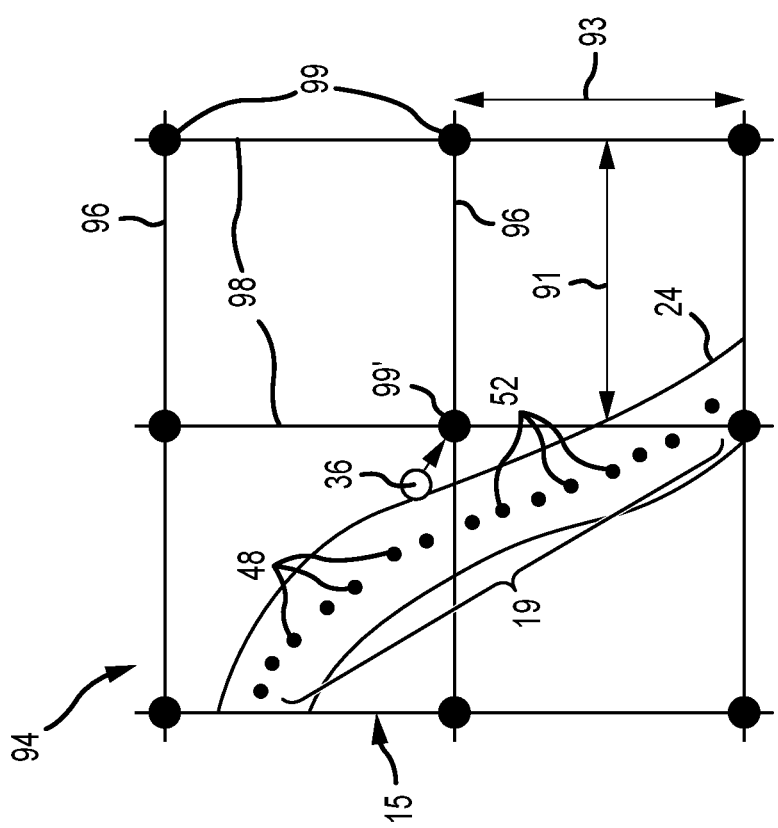
FIG.9(b)
FIG.9(a)

REAL-TIME CORRELATION OF SENSED POSITION DATA WITH TERRESTRIAL FEATURES

TECHNICAL FIELD

The present invention relates to data processing systems in general and more specifically to data processing systems for correlating sensed position data with terrestrial features.

BACKGROUND

Mining operations, and in particular surface mining operations, increasingly rely on the analysis of data streams transmitted by various types of mining equipment and vehicles in order to increase productivity and reduce costs. One such data stream may comprise information and data relating to the position and movement of the mining equipment and vehicles within the mining environment. Such position data are commonly obtained from satellite-based position location systems, such as the GPS, Galileo, and GLONASS systems, operatively associated with the mining equipment. Alternatively, the position data may be obtained or derived from other types of position sensing systems, such as inertial-based systems or ground-based radio navigation systems.

Regardless of the particular type of position sensing system that is used, the resulting position data are subsequently transmitted to a processing system for analysis. In a typical example, the position data may be used by the processing system for fleet tracking and dispatch purposes, thereby allowing for the more efficient deployment and movement of the equipment and vehicles within the mining environment. However, other types of data analysis systems are known, and still others being developed, that rely at least in part on such position data.

One problem associated with systems that use vehicle position data relates to the problem of correlating or matching the measured position data with terrestrial features. In a mining environment, such terrestrial features may involve the road network being traveled by the vehicles. Such terrestrial features may also include other aspects of the mining environment and infrastructure system as well, such as the locations of various service buildings, fueling stations, loading locations, and dump locations, just to name a few.

The difficulties associated with correlating the measured position data with terrestrial features are due in part to inherent uncertainties and errors associated with the vehicle position location system (e.g., GPS). These uncertainties and errors may be compounded by the nature of the mining environment itself. For example, many mining environments are situated in mountainous areas which may adversely impact the accuracy of satellite-based position data. The presence of mountainous terrain may also cause the position data to include a large number of completely erroneous position fixes or 'outliers' that are located a significant distance from the actual position of the vehicle.

Besides difficulties associated with obtaining accurate position measurements, still other difficulties are associated with the configuration of the terrestrial features in the mining environment. For example, the road network in an open pit mine often contains sections of roads that are located in close proximity to one another, on closely parallel paths, and may involve comparatively complex intersections, all of which can create difficulties in properly correlating or matching the measured position of the vehicle with the correct road or location.

Still other problems are created by the dynamic nature of the mining environment itself. For example, the road network and infrastructure system are not static and are frequently changed and reconfigured as the mining operation progresses. Various roads comprising the road network are frequently moved and relocated. Similarly, elements of the mining infrastructure, e.g., service buildings, fueling stations, loading locations, and dump locations, also may be moved from time-to-time. Therefore, besides having to accurately correlate position data with known terrestrial features, a position correlation system must also be capable of accurately correlating the position data with new or relocated terrestrial features, often on a daily basis.

The failure to accurately correlate the positions of the vehicles with such terrestrial features can significantly impact the value of systems that rely on accurate position location and placement of the vehicles. For example, and in the context of a fleet tracking and dispatching system, locating a haul truck on the incorrect road can lead to incorrect dispatch decisions and/or lead to congestion problems if other vehicles are deployed on roads thought to be free of vehicles. Besides limiting the ability of fleet tracking and dispatching systems be used with optimal effectiveness, the difficulties associated with accurately correlating vehicle positions with terrestrial features limits the ability of mining operators to develop new analytical systems and tools to further improve productivity and reduce costs.

SUMMARY OF THE INVENTION

One embodiment of a method of correlating sensed position data with terrestrial features involves: Receiving the sensed position data from a position sensing system operatively associated with a moveable object; selecting a reduced set of snap point candidates from terrestrial data based on a sensed position point; choosing a best snap point candidate from among the reduced set of snap point candidates based on a plurality of predictive variables and corresponding weighting factors for each snap point candidate in the reduced set of snap point candidates; and snapping the sensed position point to the best snap point candidate to produce a snapped position point. The selecting, choosing, and snapping steps are performed in substantially real time so that the method correlates the sensed position data from the moveable object with terrestrial features in substantially real time.

Another correlation method includes: Selecting a reduced set of snap point candidates from the terrestrial data based on a sensed position point; choosing a best snap point candidate from among the reduced set of snap point candidates based on a plurality of predictive variables and corresponding weighting factors for each snap point candidate in the reduced set of snap point candidates; and snapping the sensed position point to the best snap point candidate to produce a snapped position point.

Also disclosed is a non-transitory computer-readable storage medium having computer-executable instructions embodied thereon that, when executed by at least one computer processor cause the processor to: Receive sensed position data from a position sensing system operatively associated with a moveable object; select a reduced set of snap point candidates from the terrestrial data based on a sensed position point; choose a best snap point candidate from among the reduced set of snap point candidates based on a plurality of predictive variables and corresponding weighting factors for each snap point candidate in the reduced set of snap point candidates; and snap the sensed position point to the best snap point candidate to produce a snapped position point.

Another non-transitory computer-readable storage medium has computer-executable instructions embodied thereon that, when executed by at least one computer processor cause the processor to: Select a reduced set of snap point candidates from terrestrial data based on a sensed position point; choose a best snap point candidate from among the reduced set of snap point candidates based on a plurality of predictive variables and corresponding weighting factors for each snap point candidate in the reduced set of snap point candidates; and snap the sensed position point to the best snap point candidate to produce a snapped position point.

A position correlation system is also disclosed that may include a computer processor, the computer processor receiving position data from a position sensing system operatively associated with a moveable object. A user interface operatively associated with the computer processor allows a user to interface with the computer processor. A terrestrial database operatively associated with the computer processor includes terrestrial survey data associated with terrestrial features in a defined operational area. A snapping algorithm operatively associated with the computer processor selects a reduced set of snap point candidates from the terrestrial data based on a sensed position point; chooses a best snap point candidate from among the reduced set of snap point candidates based on a plurality of predictive variables and corresponding weighting factors for each snap point candidate in the reduced set of snap point candidates; and snaps the sensed position point to the best snap point candidate to produce a snapped position point. The computer processor produces output data relating to sequential positions of the moveable object with respect to the terrestrial features in substantially real time.

BRIEF DESCRIPTION OF THE DRAWINGS

Illustrative and presently preferred exemplary embodiments of the invention are shown in the drawings in which:

FIGS. 9(a,b) are pictorial representations of the two-dimensional grid used to define search areas for snap points;

DETAILED DESCRIPTION OF THE PREFERRED EMBODIMENTS

Figure 1:
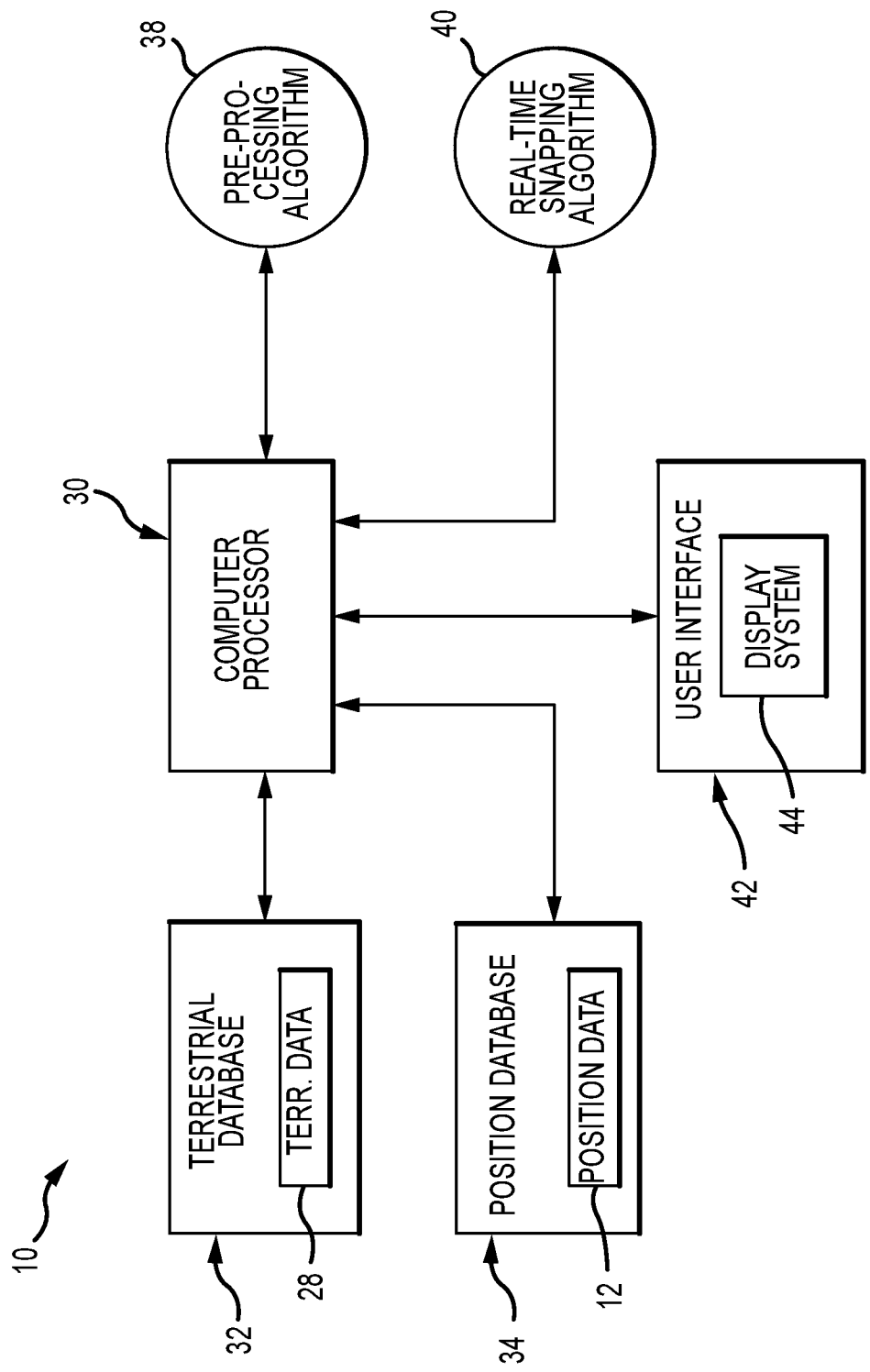
FIG. 1 is a schematic representation of one embodiment of a position correlation system according to the present invention.

A position correlation system 10 according to one embodiment of the present invention is shown and described herein as it could be used to correlate sensed position data 12 with terrestrial features 14 located within a defined operational area 16. See FIGS. 1 and 2. The defined operational area 16 may comprise a surface mine 18 or at least a portion of the surface mine 18. The sensed position data 12 may be derived from one or more moveable objects 20, such as various types of mining equipment and vehicles, operating within the surface mine 18. The terrestrial features 14 may comprise a road network 22 defined by a plurality of roads 24. The terrestrial features 14 may also comprise other aspects of the mining infrastructure system 26, including, for example, the locations of various service buildings, fueling stations, loading locations, dump locations, and the like. Data regarding the locations of such terrestrial features 14 comprise terrestrial data 28. The terrestrial data 28 may include any of a wide range of other information and data about the terrestrial features 14, some of which will be described in further detail herein and others of which will become apparent to persons having ordinary skill in the art after having become familiar with the teachings provided herein.

Figure 2:
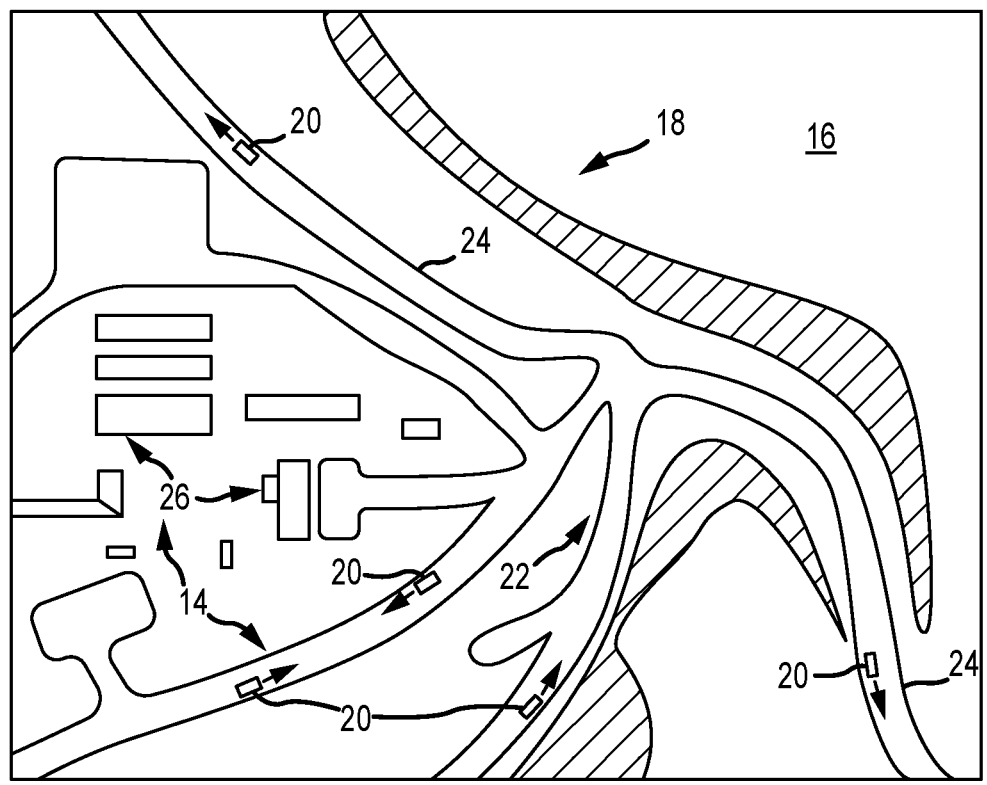
FIG. 2 is a pictorial representation of a portion of a defined operational area of a mining operation showing various terrestrial features, including roads and buildings, as well as vehicles moving along the various roads.

With reference now primarily to FIG. 1, the position correlation system 10 may comprise a computer processor or computer processing system 30 that may be operatively connected to a terrestrial database 32 and, optionally, to a position database 34. The terrestrial database 32 may comprise terrestrial data 28. Terrestrial data 28 may comprise a plurality of records or data files that identify the locations of the various terrestrial features 14, e.g., the various roads 24 of road network 22 as well as elements of the mining infrastructure system 26, as already described. In addition to location information, terrestrial data 28 may also include additional information about the various terrestrial features 14. The position database 34 may comprise sensed position data 12 obtained from position sensing systems (not shown) operatively associated with the moveable objects 20. The sensed position data 12 may comprise a plurality of records or data files that identify the location of one or more moveable objects 20 operating within the defined operational area 16. Sensed position data 12 may also include other information about the moveable objects or vehicles 20 such as, for example, the heading of the vehicle 20.

The sensed position data 12 may be collected over time (i.e., may comprise temporal or time-based position data), in which individual sensed locations or position fixes 36 (best seen in FIG. 12) of the moveable object or vehicle 20 are obtained at discrete times. Accordingly, a suitable time stamp may be associated with each individual sensed position point or position fix 36 comprising the sensed position data 12. In one embodiment, at least a portion of the sensed position data 12 is obtained from a satellite-based position location system (e.g., GPS) and may be received by the computer processing system 30 in substantially real-time by a suitable data acquisition system (not shown). In other embodiments, the configuration of the particular system (e.g., network) may introduce some amount of delay in transmitting the sensed position data 12 to the computer processing system 30.

The computer processor 30 may also be operatively connected to a pre-processing algorithm 38, a real-time snapping algorithm 40, and a user interface 42. User interface 42 may include a display system 44. As will be described in much greater detail herein, the computer processor 30 may use or implement the pre-processing algorithm 38 from time-to-time to prepare the terrestrial data 28 for further processing by the real-time snapping algorithm 40. The pre-processing algorithm 38 may also be used to perform coordinate system conversions and to correct position location data to compensate for factors that may introduce spatial bias or other inaccuracies between the two data sets. The real-time snapping algorithm 40 may be used to correlate the sensed position data 12 with the terrestrial features 14 in substantially real-time, i.e., as the various vehicles 20 move within the defined operational area 16.

Figure 3:
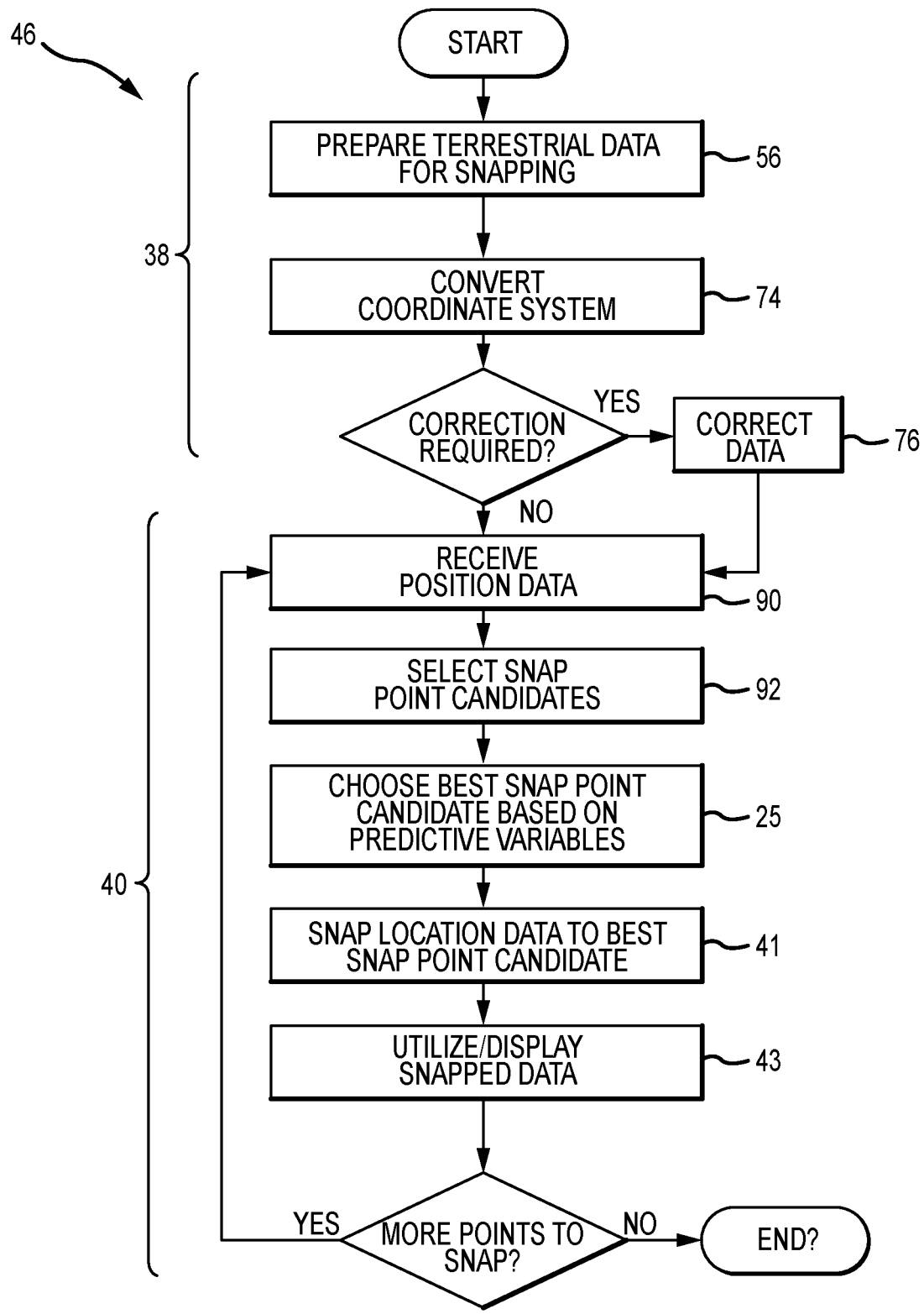
FIG. 3 is a flow chart representation of one embodiment of a method of correlating sensed position data with terrestrial features showing major steps of the pre-processing and real-time snapping algorithms.

Referring now to FIG. 3, computer processor 30 may implement a method 46 to correlate sensed position data 12 with the terrestrial features 14. In this regard it should be noted that it is generally preferred, but not required, that the correlation process of the present invention be conducted in real-time or substantially real-time. Such real-time correlation will allow correlated data to be used immediately by operators and/or other systems to improve operational efficiencies or to provide other benefits now known in the art or that may be developed in the future that would require or benefit from such real-time correlation.

The first series of steps in method 46 may be related to the implementation of the pre-processing algorithm 38 (FIG. 1). As mentioned above, the pre-processing algorithm 38 may be used to prepare the terrestrial data 28 for further processing by the real-time snapping algorithm 40. Such data preparation may include, for example, the creation of snap points 48 (FIG. 5), from the terrestrial data 28. Pre-processing algorithm 38 may also be used to perform any coordinate transformations that may be required or desired to ensure that the terrestrial data 28 are in the same coordinate system as the sensed position data 12. Pre-processing algorithm 38 may also be used to determine whether any correction of the terrestrial data 28 is required to compensate for any significant variance or spatial bias that may be detected between the two data sets (i.e., the sensed position data 12 and the terrestrial data 28). In one embodiment, computer processor 30 is configured or programmed to implement the pre-processing algorithm 38 each time the terrestrial database 32 is updated. In one embodiment, the terrestrial database 32 is updated on a daily basis. Therefore, computer processor 30 implements the pre-processing algorithm 38 on a daily basis.

After the pre-processing algorithm 38 has been implemented, computer processor 30 may then use or implement the real-time snapping algorithm 40 in order to correlate the sensed position data 12 and terrestrial features 14 in substantially real-time. As used herein, the term real-time means that the correlation process can be completed with respect to each sensed position point 36 sufficiently quickly to allow a user or other systems (not shown) to make meaningful use of the correlated data without significant delay. By way of example, in one embodiment, the computer processor 30 is able to perform the correlation with a delay (i.e., latency), of less than about 1 second between the time at which a sensed location or position fix 36 is provided to computer processor 30 and when the correlation, i.e., the snapping of the sensed position point 36 to the best snap point 54 is complete. See FIG. 12. As will be described in much greater detail herein, the real-time snapping algorithm 40 is able to perform the correlation or snapping function in substantially real-time due to the effective 'pre-filtering' of snap points 48. The pre-filtering of snap points 48 produces a reduced set 50 of snap point candidates 52 (FIG. 9b). The reduced set 50 of snap point candidates 52 significantly reduces the number of snap points 48 that must be analyzed, thereby significantly reducing the time required to perform the correlation.

Figure 12:
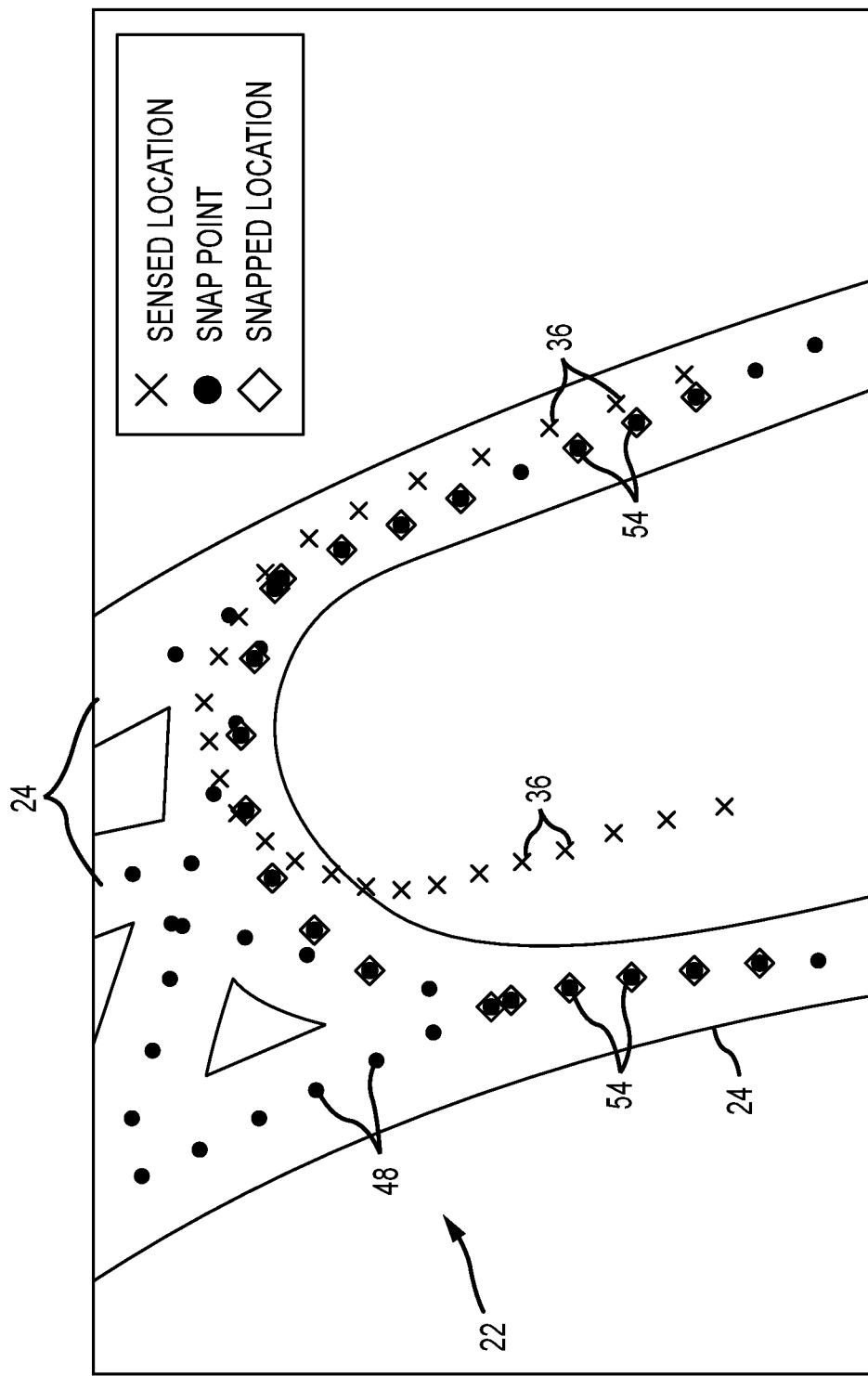
FIG. 12 is a pictorial representation showing snap points associated with a road network, sequential sensed position fixes, and the corresponding best snap points.

The accuracy of the correlation or snapping function is improved by choosing the best snap point 54 (FIG. 9b) based on a plurality of predictive variables $PV_{1-4}$ and corresponding weighting factors $w_{1-4}$ (see Equation 1). As will also be described in much greater detail herein, the predictive variables $PV_{1-4}$ and corresponding weighting factors $w_{1-4}$, are used to calculate a score for each snap point candidate 52 in the reduced set 50 of snap point candidates. The calculated score is then used to select or choose the best snap point candidate 54 from among the snap point candidates 52 in the reduced set 50 of snap point candidates. The best snap point candidate 54 represents the best correlation between the sensed position data 12 and terrestrial features 14 for the particular sensed location or position fix 36. The various steps of process 40 may be repeated on subsequent sensed locations or fixes 36 to correlate the sensed position data 12 from the moveable object or vehicle 20 with the terrestrial features in substantially real time. See FIG. 12. The correlation process therefore allows the position of the vehicle(s) 20 to be accurately tracked over time as it moves within the defined operational area 16. If desired, the sequential vehicle positions and correlated terrestrial features 14 may be displayed on the display system 44 to provide a user with a substantially real-time indication or depiction of the vehicle 20 as it moves within the defined operational area 16, as depicted in FIG. 12.

A significant advantage of the present invention is that it may be used to accurately and rapidly (i.e., in substantially real-time) correlate the sensed position data 12 with terrestrial features 14. The ability to perform the correlation in substantially real-time allows the correlated data to be used in ways and to realize advantages not possible in systems wherein the correlations are not made in real time. For example, besides allowing system operators to view the movement of vehicles and other moveable objects in substantially real-time, and in correct relation to the terrestrial features, the real-time correlations provided by the present invention can be used by other systems now known in the art or that may be developed in the future to improve the operation, deployment, efficiency, or productivity of the tracked vehicles and moveable objects.

Still other advantages are associated with the pre-filtering processes associated with the methods disclosed herein. For example, the pre-filtering processes substantially reduce the processing resources required to perform the correlations, thereby speeding the correlations so that they can be produced in substantially real-time. Alternatively, the reduction in processing resources will permit the use of lower performance computer systems to be used, which are typically much less expensive to procure and operate.

Still yet other advantages are associated with the use of the predictive variables and corresponding weighting factors to select the best snap point candidate. For example, we have discovered that highly accurate correlations can be made based on a relatively few predictive variables. In the particular embodiments shown and described herein, four (4) predictive variables provide highly accurate correlations, while again reducing the processing resources required to perform the correlations. The use of corresponding weighting factors also increases the accuracy of the correlations by providing the appropriate weight to the predictive variables. This ensures that those predictive variables that are more important in the selection of the best snap point candidates are weighted more heavily compared with variables that, while still important, have reduced levels of importance.

Having briefly described certain exemplary embodiments of systems and methods of the present invention, as well as some of its more significant features and advantages, various embodiments and variations of the present invention will now be described in detail. However, before proceeding the description, it should be noted that while various embodiments are shown and described herein as they could be used to correlate sensed position data 12, such as satellite position data, with terrestrial data 28 in a mining environment 18, the present invention is not limited to use with such data types and in such environments. For example, the sensed position data 12 need not comprise satellite position data but instead could comprise position data derived by other means, such as by inertial- or ground-based navigation systems. Also, while the present invention may be used to advantage in open pit mining environments 18 where it is difficult to obtain accurate and reliable position data 12 and where terrestrial features 14 are prone to frequent movement or relocation, the present invention could be used in any of a wide range of environments and for any of a wide range of purposes, some of which are described herein and others of which would become apparent to persons having ordinary skill in the art after having become familiar with the teachings provided herein. Consequently, the present invention should not be regarded as limited to use in any particular type of position data, environment, or applications.

Referring back now to FIG. 1, one embodiment of the position correlation system 10 may comprise a computer processor or computer processing system 30 that is operatively connected to the various databases, systems, and algorithms described herein. The various algorithms may be embodied in various software programs, modules, or applications provided on non-transitory computer-readable storage media (not shown) accessible by computer system 30. The various software programs, modules, or applications may be provided with computer-executable instructions that, when executed by the computer system 30, cause the computer system 30 to process information and data in accordance with the various methods and algorithms described herein.

Computer system 30 may comprise any of a wide range of general purpose programmable computer systems now known in the art or that may be developed in the future that are, or would be suitable for the intended application. However, because such computer systems are well-known in the art and could be readily provided by persons having ordinary skill in the art after having become familiar with the teachings provided herein, the particular computer system 30 that may be used in the embodiments shown and described herein will not be described in further detail.

Computer system 30 is operatively connected to the terrestrial database 32 and, optionally, the position database 34. The terrestrial database 32 may comprise terrestrial data 28 that identifies at least the locations of desired terrestrial features 14, although terrestrial data 28 could comprise data relating to other features or aspects of the terrestrial features 14 as well. Similarly, the position database 34 may comprise the sensed position data 12 associated with the various moveable objects, mining equipment and/or vehicles 20 operating in the defined operational area 16. Computer processing system 30 may also be operatively associated with the pre-processing algorithm 38 and the real-time snapping algorithm 40. Computer processing system 30 also may be operatively connected to the user interface system 42 to allow one or more users (not shown) to operate the computer system 30. User interface system 42 may also comprise display system 44, which may be used to provide a visual display of the correlated data and other aspects of the system 10, as depicted in FIG. 12. Computer system 30 also may be connected to a wide range of ancillary systems and devices, such as network systems, data acquisition systems, memory systems, algorithm modules, and additional databases as may be required or desired for the particular application. However, because such ancillary systems and devices are also well-known in the art and could be readily provided by persons having ordinary skill in the art after having become familiar with the teachings provided herein, the various ancillary systems and devices that may be required or desired for any particular application will not be described in further detail herein.

Considering now the various databases, the terrestrial database 32 may comprise terrestrial data 28. Terrestrial data 28 may comprise a plurality of records or data files that identify and locate the position of various terrestrial features 14 within the defined operational area 16. As mentioned earlier, the terrestrial features 14 may include, but are not limited to, the road network 22 which is defined by a plurality of roads 24. Terrestrial features 14 may also include information and data relating to any desired components of the mining infrastructure system 26, such as various service buildings, fueling stations, loading stations, dump stations, stockpiles, and the like. The terrestrial data 28 may comprise highly accurate position data, typically produced by land-based survey systems (not shown), that locate the positions of the terrestrial features 14 within the defined operational area 16. The terrestrial survey data 28 may be updated from time-to-time (e.g., once every 24 hours) as necessary to reflect changes or re-locations of the various terrestrial features 14.

Figure 5:
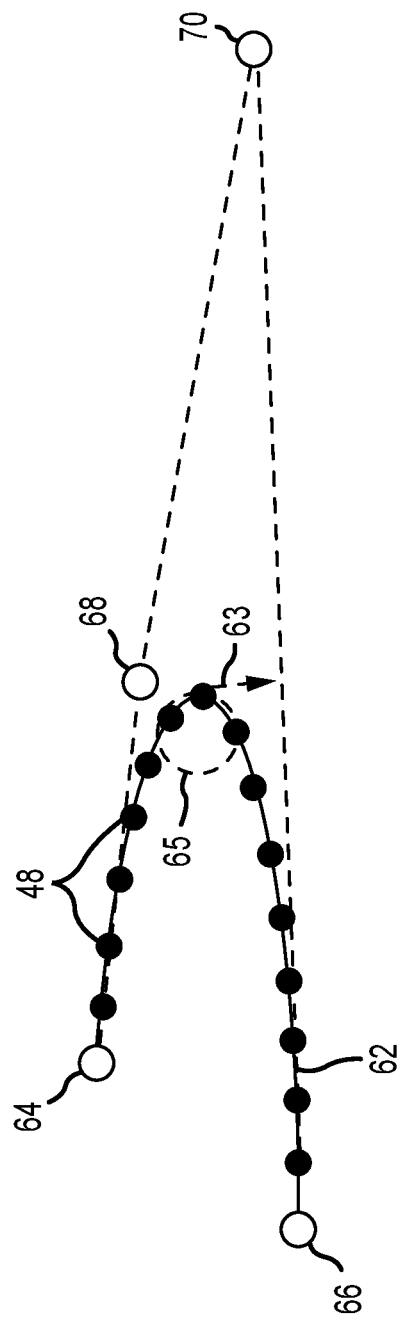
FIG. 5 is a pictorial representation of a road segment represented by a Bézier curve and snap points created on the Bézier curve.

The terrestrial data 28 may be provided in any of a variety of forms, data structures, and coordinate systems depending on the particular application and system used to generate the terrestrial data 28. Consequently, the present invention should not be regarded as limited to any particular forms, data structures, and coordinate systems for such data. By way of example, in one embodiment, the various roads 24 comprising the road network 22 (FIG. 2) are divided into a plurality of sections or segments, each of which is defined by a Bézier curve 62 having two end points 64, 66 and two control points 68, 70, as best seen in FIG. 5. The locations of the various end points 64, 66 and control points 68, 70, may be stored or provided in a mine coordinate system.

The position database 34 may comprise position data 12. The position data 12 may comprise a plurality of records or data files of information and data that identify or locate the positions of the various moveable objects or vehicles 20 within the defined operational area 16, as already briefly described. Each desired piece of equipment or vehicle 20 may be provided with a position sensing system (not shown) that senses the position of the vehicle 20 as it operates within the operational area 16. In the embodiments shown and described herein, the position sensing system may comprise a satellite-based position sensing system, such as the global positioning system (GPS). Alternatively, the position data 12 may be obtained from other types of position sensing systems, such as from inertial sensing systems or ground-based radio navigation systems. Consequently, the present invention should not be regarded as limited to any particular type of position sensing system for producing the position data 12.

In a typical application, the position data 12 derived from the position sensing systems (not shown) provided on the various vehicles 20 may be transmitted to a data acquisition system (not shown) via a wireless network (also not shown). Alternatively, other systems, devices, and configurations may be used. The data acquisition system may comprise a portion of computer system 30, although it need not be. Thereafter, the position data 12 may be reformatted and processed, if necessary or desired, before being placed into the position database 34. In this regard it should be noted that, in certain embodiments, the provision of a position database 34 is not strictly required. In such embodiments, the computer system 30 may receive the position data 12 directly, without saving the position data first in a database. However, as a practical matter, the position data 12 will nearly always be saved in some sort of memory system or database, if only on a temporary basis. Regardless of the configuration of the particular system, in one embodiment the computer processor 30 is able to access the position data 12 in substantially real-time, so that the correlation process can be performed in substantially real-time.

It should be noted that in most embodiments the position data 12 will not be continuous but will instead comprise a plurality of individual sensed locations or position fixes 36 collected over time on a periodic basis (e.g., once per second), as best seen in FIG. 12. That is, the position data 12 will comprise time-based or temporal position data. Therefore, each individual sensed location or position fix 36 may also include a time stamp that correlates the sensed location or position fix 36 with the time at which the position fix 36 was obtained.

Other information and data may be associated with each position fix 36. For example, in one embodiment, each position fix 36 may also include data relating to the heading of the vehicle 20 at the time of the position fix. Such vehicle heading data are used by the real-time snapping algorithm 40 to improve the accuracy of the correlation process. The position data 12 may be provided in any of a wide range of coordinate systems. In one embodiment, the position data 12 are provided in a 'GPS' coordinate system, comprising latitude, longitude, and altitude.

As is known, there may be significant errors and uncertainties in the position data 12 and it is not uncommon for a given position fix or sensed location point 36 to be in error by several tens, if not hundreds, of meters, particularly if the position data 12 are derived from a satellite-based position location system. These errors and uncertainties make it difficult to establish the exact location of a vehicle 20 moving within the defined operational area 16 and to correctly locate it with respect to known terrestrial features 14. For example, if the mining environment 18 comprises an open pit mine, e.g., with equipment or vehicles 20 traveling on roads 24 within the mine, satellite-based position data 12 may not reliably fix the location of the vehicle 20 on a known road 24, even though the vehicle 20 is actually traveling on the known road 24. An example of such a circumstance is depicted in FIG. 12, in which many of the sensed location points or position fixes 36 are actually located outside the boundary of the particular road 24 on which the vehicle 20 was operating.

Figure 4:
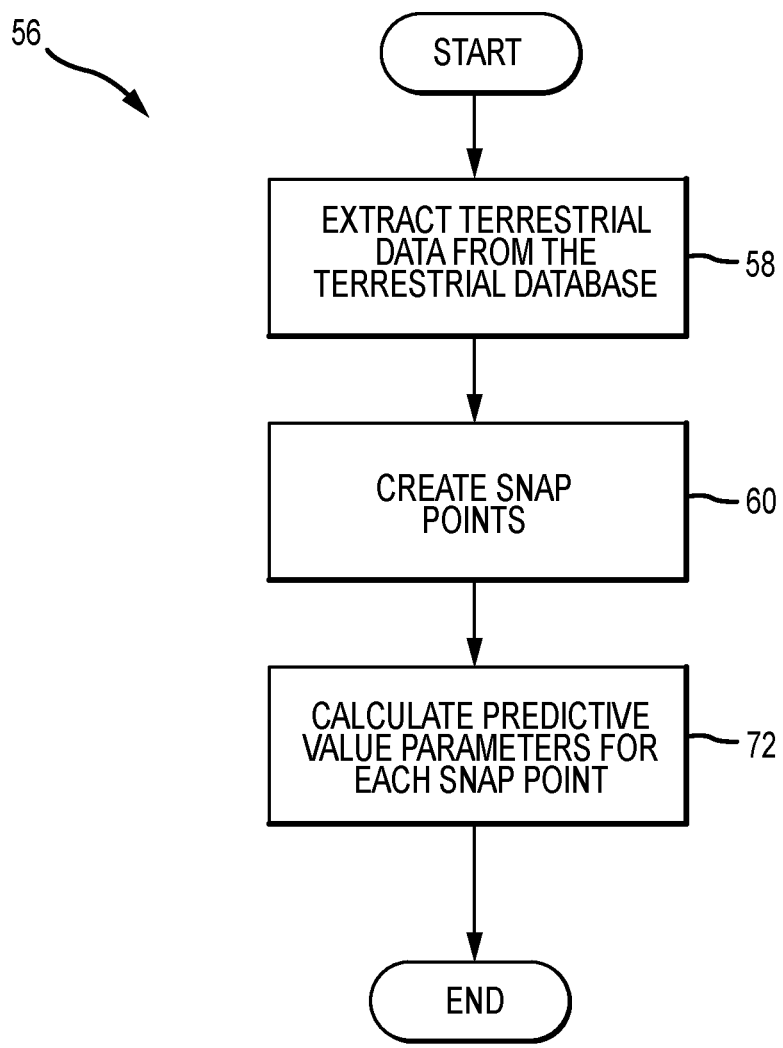
FIG. 4 is a flow chart representation of the data preparation process of the pre-processing algorithm.

Referring now primarily to FIGS. 3-5, the pre-processing algorithm 38 may be used to prepare, at step 56, the terrestrial data 28 for further processing by the real-time snapping algorithm 40. A first step 58 (shown in FIG. 4) in the preparation process 56 (shown in FIGS. 3 and 4) involves the extraction of terrestrial data 28 from the terrestrial database 32. In an embodiment wherein the vehicles 20 are to be tracked as they move along various roads 24 of road network 22, the extraction process 58 may involve the extraction of the relevant road data from the terrestrial database 32. The road data will then form the basis for the subsequent correlation of the positions of vehicles 20 as they move along the various roads 24 of road network 22. Of course, additional data could be extracted from the terrestrial database 32 as may be required or desired in any particular application or circumstance.

Once the appropriate terrestrial data has been extracted (at step 58) from the terrestrial database 32, process 56 then creates, at step 60, a plurality of snap points 48. See also FIG. 5. In the particular embodiment shown and described herein, each road 24 of road network 22 is represented and stored as a plurality of contiguous sections or segments, each of which is defined by a Bézier curve 62 having two end points 64, 66 and two control points 68, 70, as best seen in FIG. 5. Snap points 48 for each Bézier curve 62 may be created by dividing the Bézier curve 62 into a predetermined number of intervals. In one embodiment, the predetermined number of intervals correspond to a terrestrial distance of about 9.1 m (about 30 ft). Alternatively, other intervals could also be used. Each snap point 48 is then assigned a location ID which, in one embodiment, comprises a start endpoint, an end endpoint, a distance from the end point 64 of Bézier curve 62, and a distance to the end point 66 of Bézier curve 62. Thus, each location ID defines the location of each snap point 48 on a specific Bézier curve 62 in the mine coordinate system.

Once all of the snap points 48 have been created, process 56 then proceeds to step 72 in which a number of predictive variable parameters are calculated for each snap point 48 created by step 60. In one embodiment, the predictive variable parameters for each snap point 48 include the tangent angle 63 (e.g., as measured from true north) of the snap point 48, the local road curvature 65 (e.g., in units of $m^{-1}$) at the snap point 48, as well as the intersection type, e.g., the number of other snap points 48 that are connected to the particular snap point 48. For example, a snap point 48 located at a road intersection may be connected to 3 or more other snap points 48 on other roads 24, as depicted in FIG. 12.

Referring back now to FIG. 3, if necessary, the pre-processing algorithm 38 may also convert, at step 74, the coordinate system of the terrestrial data 28 into the coordinate system of the sensed position data 12. For example, in an embodiment wherein the terrestrial data 28 are provided in a mine coordinate system and wherein the sensed position data 12 are provided in a GPS coordinate system (i.e., latitude, longitude, and altitude), then step 58 may be performed to convert the mine coordinate system of the terrestrial data 28 into the GPS coordinate system. Any of a wide range of coordinate transformation algorithms now known in the art or that may be developed in the future may be used for this purpose. However, since processes for performing such coordinate transformations are well-known in the art and could be readily provided by persons having ordinary skill in the art after having become familiar with the teachings provided herein, the particular coordinate transformation process used in conjunction with the present invention will not be described in further detail herein. Finally, it should be noted that step 74 may be performed before or after step 56, depending on any of a wide range of factors and considerations. Therefore, pre-processing algorithm 38 should not be regarded as limited to performing the coordinate transformation step 74 in any particular order.

Depending on assumptions made when the mine site was developed and the terrestrial data 28 created, there may be spatial biases or other incongruities between the two data sets (e.g., the sensed position data 12 and the terrestrial data 28). Correction process 76 may be implemented to correct for the bias or other incongruity between the two data sets.

Figure 6:
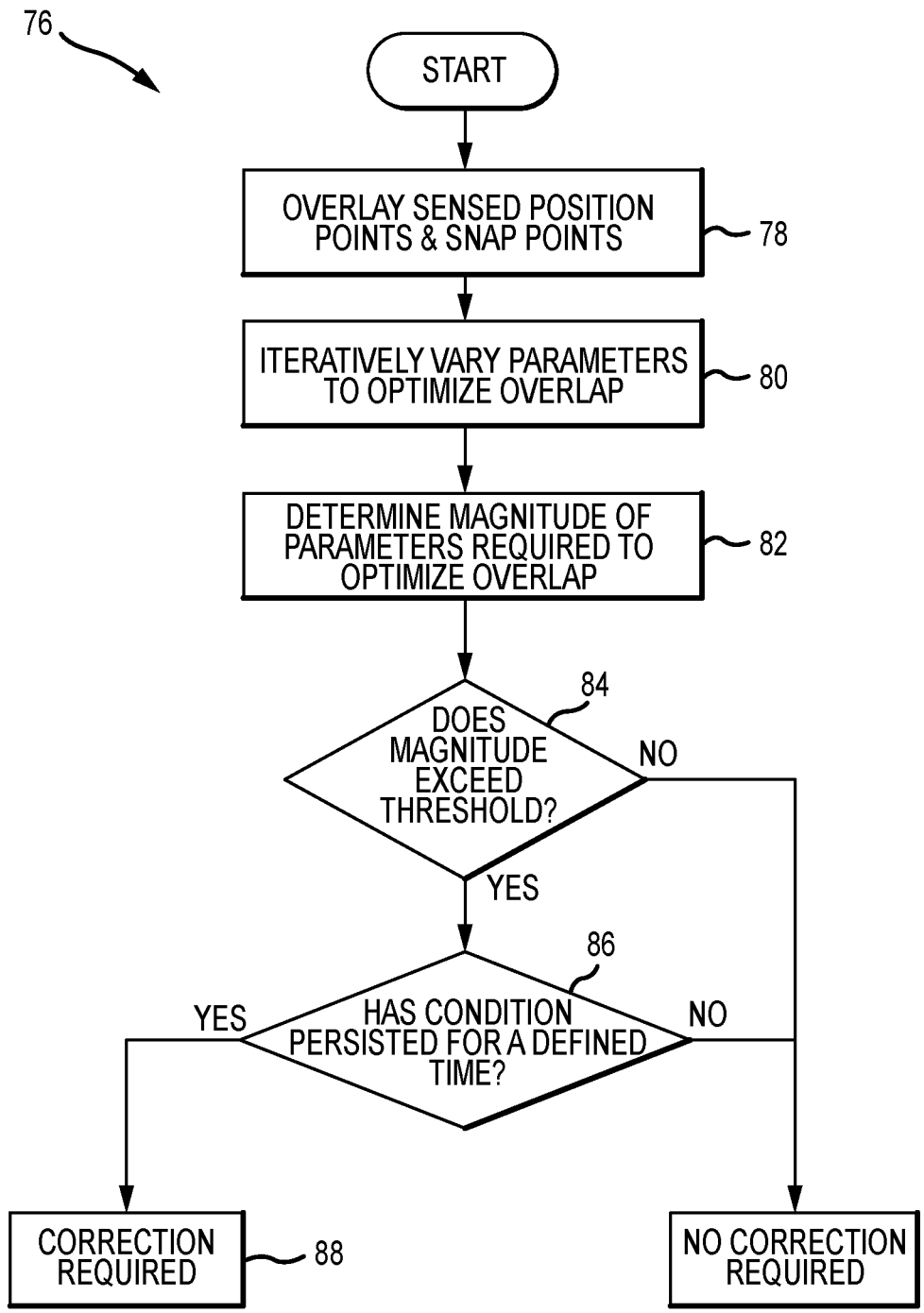
FIG. 6 is a flow chart representation of the data correction process of the pre-processing algorithm.
Figure 7B:
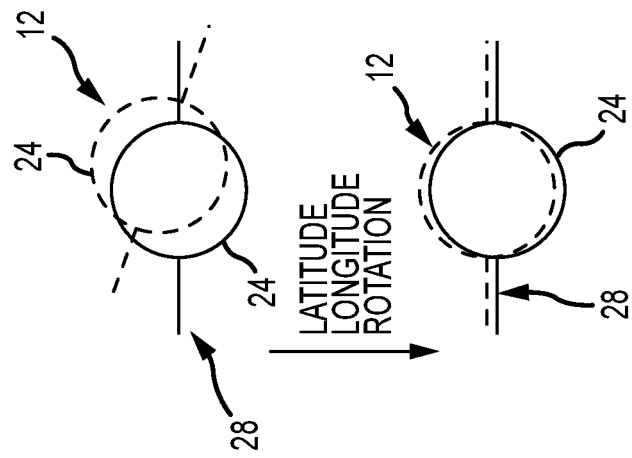
FIGS. 7(a,b) are schematic representations of a mismatch or position bias between terrestrial data and sensed position data and how that bias may be corrected.
Figure 7A:
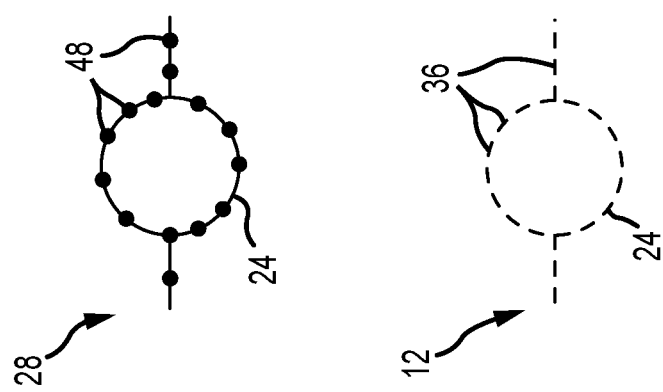

With reference now to FIGS. 6, 7*a*, and 7*b*, and with occasional reference to FIG. 3, a first step 78 in correction process 76 involves 'overlaying' the snap points 48 created for the road network 22 with a plurality of sensed position points 36 collected from the position sensing systems of the various vehicles 20. A schematic depiction of the two data sets (e.g., the terrestrial data 28 and sensed position data 12) that are representative of the same terrestrial feature 14 (e.g., portion of a road 24), are depicted in FIG. 7*a*. After being overlain on one another, various location parameters (e.g., latitude, longitude, and rotation) of the sensed position data 12 are iteratively varied at step 80 to optimize the overlap of the two data sets, as best seen in FIG. 7*b*. Because there will rarely be an optimal "fit" between the snap points 48 and the sensed position points 36 of the two data sets, the correction process 76 determines the magnitude, at step 82, of the iterative variations required to optimize the overlap. If the magnitude of any of the location parameters exceeds a predetermined threshold for that parameter (e.g., as determined at step 84) for a predetermined time (e.g., e.g., as determined at step 86), then the correction process 76 will correct, at step 88, the mapping between the two data sets. Otherwise, no correction will be applied.

By way of example, if the magnitude of the differences between the latitude or longitude of the two data sets exceeds 0.0001 degrees, or if the difference between the rotation required to align the data sets exceeds 0.1 degrees, for a time period of 10 consecutive days, then the mapping will be corrected at step 88.

As mentioned earlier, the computer processor 30 may use or implement the pre-processing algorithm 38 from time-to-time (e.g., each time the terrestrial data 28 are updated) to prepare the terrestrial data 28 for further processing by the real-time snapping algorithm 40. Once this pre-processing has been performed, the computer processor 30 may implement the real-time snapping algorithm 40 to correlate the sensed position data 12 and terrestrial features 14. The real-time snapping algorithm 40 may be used on a continuous basis (i.e., in which the various steps thereof are repeated in a loop, as depicted in FIG. 3) so that the sensed position data 12 are correlated with the terrestrial features 14 on a continuous basis and in substantially real-time as the vehicle(s) 20 move within the defined operational area 16.

Referring now to FIGS. 3 and 8-11, a first step 90 (FIG. 3) in the real-time grid snapping algorithm 40 is to receive position data 12 from one or more vehicles 20 operating within the defined operational area 16. Depending on the configuration of the particular system, the position data 12 may be received directly from a position sensing system(s) operatively associated with the vehicle(s) 20. Alternatively, the position data 12 may be received from a suitable data acquisition system (not shown) that first collects the position data 12 from the vehicles 20. As described above, the position data 12 may comprise a plurality of individual sensed locations or position fixes 36 that may be obtained by the position sensing system from time-to-time (e.g., once per second). Each individual sensed location or position fix 36 may comprise information regarding the position or location of the vehicle 20 at the time of the position fix 36, a time-stamp indicating the time the vehicle 20 was at the particular location, and the heading of the vehicle 20 at that particular time. Of course, the position data 12 for each individual sensed location 36 may comprise additional information, if desired.

After receiving the position data 12 (e.g., as a data stream on a substantially continuous basis), at step 90, the real-time snapping algorithm 40 then proceeds to step 92 (FIG. 3) in which a reduced set 50 of snap point candidates 52 are selected from among the snap points 48 previously created in step 60 (FIG. 6). Step 92 thus involves a 'pre-filtering' of the snap points 48, significantly reducing the number of snap points 48 that need to be analyzed.

Figure 8:
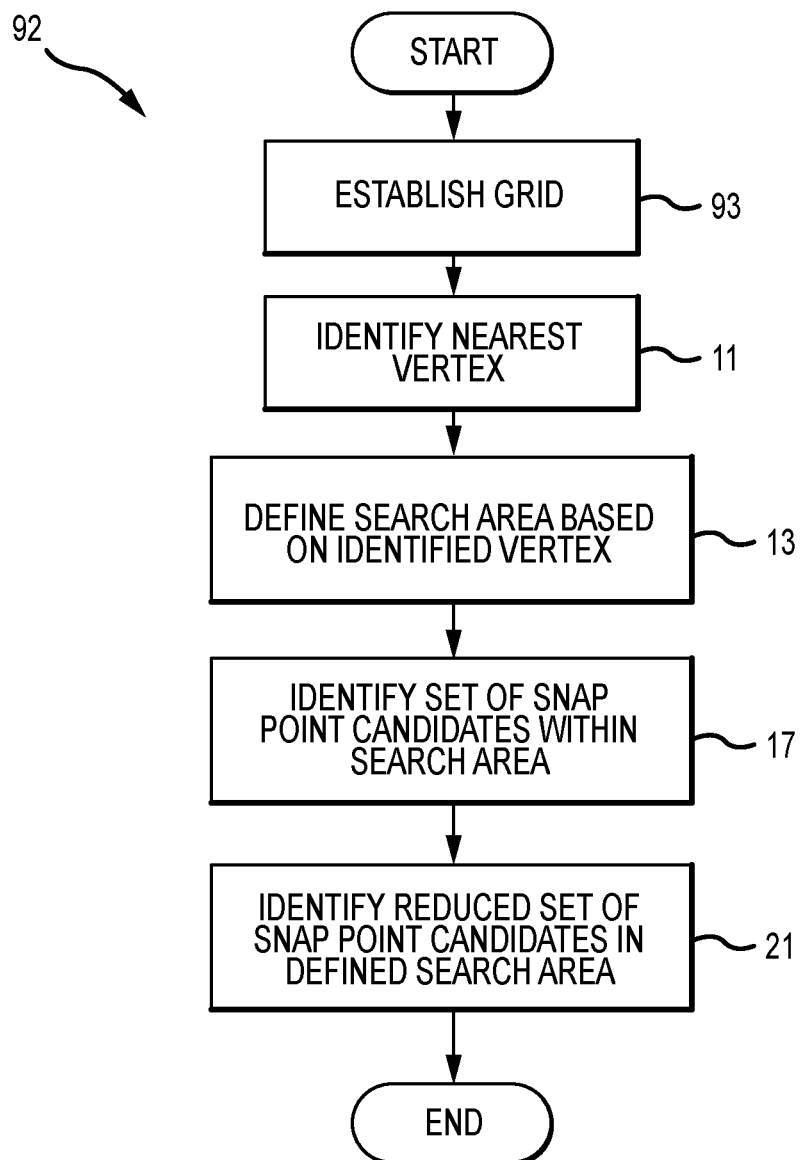
FIG. 8 is a flow chart representation of the process of selecting snap point candidates of the real-time snapping algorithm.

Referring now to FIGS. 8, 9*a*, and 9*b*, the 'pre-filtering' process of step 92 may involve the creation or establishment, at step 93, of a two-dimensional grid 94. Two-dimensional grid 94 is defined by a plurality of intersecting lines 96, 98. A vertex 99 is defined at each intersection point, as best seen in FIGS. 9*a* and 9*b*. Before proceeding with the description, it should be noted that the two-dimensional grid 94 is an abstract construct only and is used by the computer system 30 to pre-filter the number of snap points 48 required to be analyzed. It is not an actual grid that is created in the defined operational area 16. In one embodiment, the each set of intersecting lines 96, 98 comprises a plurality of lines that are arranged in substantially parallel, spaced-apart relation. The set of lines 96 may comprise a plurality of 'horizontally' oriented lines, whereas the set of lines 98 may comprise a plurality of 'vertically' oriented lines. Thus, the two sets of intersecting lines 96 and 98 are generally perpendicular to one another. Alternatively, other arrangements are possible (e.g., in which the two sets of intersecting lines 96 and 98 are not perpendicular to one another), as would become apparent to persons having ordinary skill in the art after having become familiar with the teachings provided herein. Consequently, the two-dimensional grid 94 should not be regarded as limited to the particular configuration shown and described herein.

The spacings 91 and 93 between the respective sets of horizontal and vertical lines 96 and 98 may be selected to correspond to any of a wide range of terrestrial distances, with smaller distances generally resulting in a less 'granular' or higher resolution snapping process. However, smaller terrestrial distances may also increase processing time to the extent that the algorithm 40 is no longer able to produce the required correlations in substantially real-time. By way of example, in one embodiment, the spacings 91 and 93 between the respective sets of lines 96 and 98 correspond to a terrestrial distance of about 91 m (about 300 ft). So configured, then, the two-dimensional grid 94 in one embodiment comprises a two-dimensional grid of squares, wherein the side of each grid square corresponds to a terrestrial distance of about 91 m (about 300 ft). The locations of the lines 96, 98, and vertices 99 may be provided in the same coordinate system used for the position data 12 (e.g., a GPS coordinate system).

A next step 11 in the method or process 92 identifies the vertex 99 that is nearest to the particular sensed location or position fix 36. In the example depicted in FIG. 9*a*, the nearest vertex 99 is the vertex 99' located in the center of the two-dimensional grid 94. Next, in step 13, a search area 15 is defined based on the identified vertex 99'. In one embodiment, the search area 15 is defined by the four (4) grid squares that share the identified vertex 99'. Alternatively, the search area 15 could be defined by some other number of grid squares.

After the search area 15 has been defined (e.g., in step 13), step 17 identifies as a set 19 of snap point candidates 52, those snap points 48 that are contained within the search area 15. In FIG. 9*a*, the set 19 of snap point candidates 52 comprises fifteen (15) individual snap points 48 defining that portion of the road 24 shown within the four (4) grid squares defining search area 15. Because each snap point 48 within the search area 15 is regarded as a potential snap point for the particular sensed location or position fix 36, the snap points 48 within the set 19 are referred to herein as 'snap point candidates' 52. While the pre-filtering process 92 could be terminated at this point, an additional filtering step may be conducted in order to further reduce the number of possible snap point candidates 52 to be analyzed.

Referring now to FIG. 9*b*, an additional filtering step 21 (FIG. 8) may involve the identification of the reduced set 50 of snap point candidates 52. The reduced set 50 of snap point candidates 52 is selected from the set 19 of snap point candidates 52 identified in step 17. More specifically, the reduced set 50 of snap point candidates 52 is identified based on the snap point candidates 52 in the set 19 of snap point candidates that are within a predetermined distance 23 from the sensed position point 36. In the particular example described herein, the reduced set 50 of snap point candidates 52 identified in step 21 reduces to six (6) the number of snap point candidates 52 that need to be considered or analyzed.

The predetermined distance 23 may be selected to correspond to any of a wide range of terrestrial distances, with smaller distances generally resulting in a less 'granular' or higher resolution snapping process. However, smaller terrestrial distances may also increase processing time to the extent that the algorithm 40 is no longer able to produce the required correlations in substantially real-time. It may also reduce by too large an extent the number of snap point candidates 52, thereby possibly resulting in the failure to find a correlation. By way of example, in one embodiment, the predetermined distance 23 is selected to correspond to a terrestrial distance of about 45 m (about 150 ft).

Referring back now primarily to FIGS. 3, 9*b*, and 10, the next step 25 in the real-time snapping algorithm 40 chooses the best snap point candidate 54 (FIG. 9*b*) from among the snap point candidates 52 in the reduced set 50 of snap point candidates identified in step 21 (FIG. 8). The best snap point candidate 54 is selected or chosen based on a plurality of predictive variables (e.g., $PV_{1-4}$) and corresponding weighting factors (e.g., $w_{1-4}$). Thus, the best snap point candidate 54 will not necessarily be the snap point candidate 52 that is located nearest to the particular sensed location point or position fix 36, as depicted in FIG. 9*b*.

The predictive variables that we have identified as best predicting the appropriate correlation for the snap point data are referred to herein as "$PV_{1-4}$," respectively, and are defined as follows:

$D_{GPS}$ ("$PV_1$")—The distance between the sensed position point 36 and the snap point candidate 52;

θ ("$PV_2$")—The difference between a heading angle (e.g., of the vehicle 20) associated with the sensed position point 36 and the tangent vector 63 (FIG. 5) associated with the snap point candidate 52;

Segment Connectivity ("$PV_3$")—The Segment Connectivity predictive variable is assigned a value of 1 of the road segment of the previous snap point and the current snap point candidate 52 share at least one end point. The Segment Connectivity predictive variable is assigned a value of 0 if they do not.

Ω ("$PV_4$")—The difference between an angle from the previous snapped position point to the snap point candidate 52 and the average of the tangent angles 63 at the previous snapped position point and the snap point candidate 52.

For the fourth predictive variable, Q or $PV_4$, we have developed special rules to be followed in two cases. The first case relates to the endpoint of a road segment, i.e., where a road 24 comes to an end. There is a discontinuity at a road endpoint. In addition, vehicles 20 usually turn around at a road endpoint. Therefore, the corresponding heading value for the corresponding position fix 36 could be any of a wide range of headings. Therefore, the endpoint of a road segment, specifically the last snap point 48 of the road segment, is assigned a null tangent angle 63 (FIG. 5) in step 72 (FIG. 4). Similarly, for a snap point 48 located at a road intersection, multiple tangent angles 63 exist for the multiple roads that pass through the snap point 48. Thus, snap points 48 located at road intersections are also assigned a null tangent angle 63 in step 72.

Figure 10:
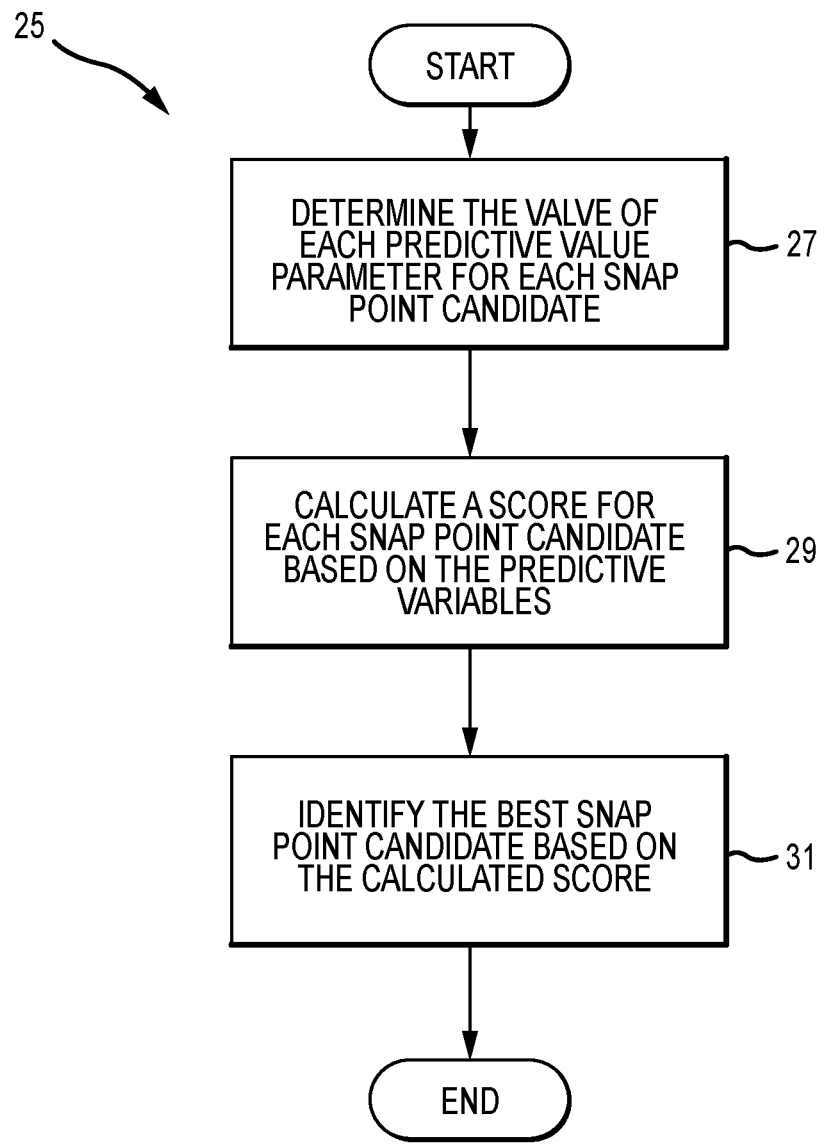
FIG. 10 is a flow chart representation of the process for choosing the best snap point candidate of the real-time snapping algorithm.

With reference now to FIG. 10, a first step 27 of the choosing process or step 25 (FIG. 3) is to determine the value of each predictive variable parameter for each snap point candidate 52 in the reduced set 50 of snap point candidates 52. As described above, the predictive variable parameter for each snap point candidate 52 in the reduced set 50 may be determined in advance for all snap points 48. In the particular embodiment shown and described herein, the predictive variable parameters were determined in step 72 (FIG. 4) of pre-processing algorithm 38.

The next step 29 in the choosing process 25 is to calculate a score for each snap point candidate 52 in the reduced set 50 (FIG. 9*b*) of snap point candidates. The score is based on the value of the predictive variables $PV_{1-4}$ and the weighting factors $w_{1-4}$ for each predictive variable. As described above, the value for each predictive variable may be determined from the predictive variable parameters for the sensed position point 36 and for the various snap point candidates 52. For example, the predictive variable $D_{GPS}$ (i.e., $PV_1$) may be obtained by calculating the terrestrial distance between the sensed position point 36 and each snap point candidate 52 in the reduced set 50 of snap point candidates. The values of the other predictive variables (i.e., $PV_{2-4}$) may be obtained from the corresponding predictive variable parameters for the particular sensed position point 36 and each of the snap point candidates 52 in the reduced set 50 of snap point candidates. In the particular embodiment shown and described herein, the best snap point candidate 54 is identified in step 31 as the snap point candidate 52 having the highest score. Further, because in this particular example the reduced set 50 of snap point candidates contains only six (6) snap point candidates 52 (FIG. 9*b*), the selection process 25 need only be performed six (6) times, once for each snap point candidate 52 in the reduced set 50 of snap point candidates, thereby significantly reducing the number of computations that must be performed.

The weighting factors $w_{1-4}$ for the various predictive variables may be determined or calculated by performing a logistic regression. The weighting factors $w_{1-4}$ represent the predictive importance of the corresponding predictive variables $PV_{1-4}$. In the particular embodiments shown and described herein, the weighting factors $w_{1-4}$ are determined or created from a 'training set' before performing or implementing the real-time snapping algorithm 40. The resulting weighting factors $w_{1-4}$ may then be stored in a suitable memory system or look-up table for use by the real-time snapping algorithm 40.

Figure 11:
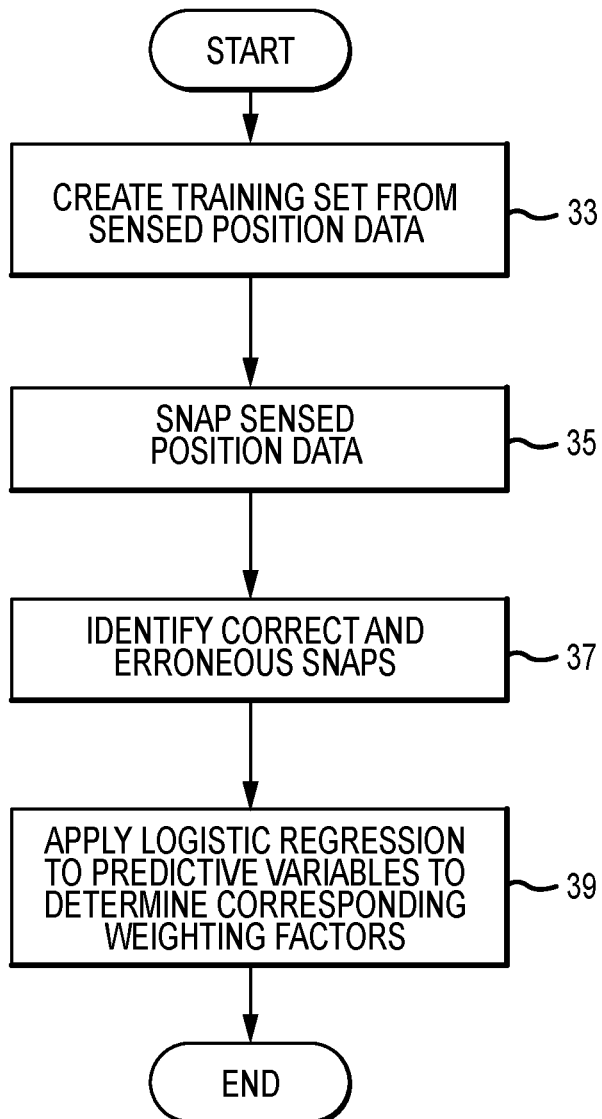
FIG. 11 is a flow chart representation of a process for determining weighting factors.

Referring now to FIG. 11, a first step 33 in calculating the weighting factors $w_{1-4}$ for the corresponding predictive variables PV$_{1-4}$ involves the creation of a 'training set' of data from the sensed position data 12. The training set may comprise a large number of sensed locations 36 obtained from the various moveable objects or vehicles 20 as they move throughout the defined operational area 16. See FIG. 2. In one embodiment, the training set was created from position data 12 obtained over a 24 hour operational period. Alternatively, other times and/or number of sensed locations 36 may be used. Thereafter, the various individual sensed locations 36 in the training set may be snapped to corresponding snap points 48, e.g., at step 35. The snapping process used may comprise the real-time snapping process described herein (but with corresponding weighting values for each predictive parameter set at a value of 1.0, for example).

The sample snap points created from the training set may then be analyzed, at step 37, to determine whether the snaps were correct or erroneous. In one embodiment, a snap point is regarded as correct if the sample snap path segment ID matched a batch path segment ID within a time window of 5 snap point events (e.g., 5 seconds where individual position fixes 36 are obtained once very second). Otherwise, the snap is regarded as incorrect. Thereafter, a logistic regression process is applied at step 39 to determine the appropriate weighing factor w$_{1-4}$ for the corresponding predictive variable PV$_{1-4}$. The logistic regression process may involve the following equation:

$$\ln\left(\frac{p}{1-p}\right) = w_1 PV_1 + w_2 PV_2 + w_3 PV_3 + w_4 PV_4 \quad (1)$$

where:
p is the probability that the snap point is correct;
PV$_{1-4}$ are the four predictive variables; and
w$_{1-4}$ are the corresponding weighting factors for the predictive variables.

Referring now to FIGS. 3, 10, and 12, the next step 41 in the real-time snapping algorithm 40 may involve snapping the particular sensed position point or fix 36 to the best snap point candidate 54 identified in step 31 (FIG. 10). Thereafter, the snapped position point may be displayed, at step 43, on display system 44 of user interface system 42. Additional sensed position points or fixes 36 may be correlated and snapped by repeating the process 40, the results of which also may be displayed on display system 44, as best seen in FIG. 12. So displaying the various snapped position points will cause the display system to provide a visual indication of the sequential positions of the moveable object or objects 20 with respect to the terrestrial features 14 in substantially real time.

For example, and as illustrated in FIG. 12, various individual sensed locations or position fixes 36 produced by a moving vehicle 20 traveling various roads 24 in road network 22 may be displayed as they are received. Because the snapping process occurs in substantially real time, the display system 44 may also display the various snapped locations (i.e., the best snap points 54), along with the various snap points 48 associated with the various roads 24 of road network 22. The real-time snapping algorithm 40 is able to correlate or snap the various individual position fixes 36 to the correct snap points (i.e., the best snap points 54) even though the vehicle 20 traveled through complex road intersections that could have easily resulted in incorrect correlations, i.e., snaps to incorrect snap points 48. Also, note that many of the sensed locations or position fixes 36 depicted in FIG. 12 do not occur within the boundaries of the various roads 24 in road network 22. This is an example of the position errors that commonly occur with a satellite-based position location system. Nevertheless, the correlation system 10 of the present invention was able to correctly correlate or snap the various out-of-bounds sensed locations or position fixes 36 to the snap points on the proper road 24.

In addition to the substantially real-time display of the snapped position points 54, the plurality of snapped position points 54 may be used to track sequential positions of the moveable object 20 over time and may be used by other systems now known in the art or that may be developed in the future to improve the operation, deployment, or efficiency of the vehicles 20 operating within the defined operational area 16.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:
1. A method of correlating sensed position data with terrestrial features, the sensed position data comprising sensed position points, the terrestrial features being located by terrestrial data, comprising:
receiving the sensed position data from a position sensing system operatively associated with a moveable object;
selecting a reduced set of snap point candidates from the terrestrial data based on a sensed position point, wherein said selecting comprises:
referencing a two-dimensional grid comprising a plurality of intersecting lines that define vertices at intersection points of the intersecting lines, the two-dimensional grid being defined by a coordinate system that corresponds to a coordinate system for locating the terrestrial features;
identifying a vertex of the two-dimensional grid that is nearest to the sensed position point;
defining a search area based on the identified vertex;
selecting as a set snap point candidates all snap points in the terrestrial data that are within the defined search area; and
selecting as the reduced set of snap point candidates all snap point candidates in the set of snap point candidates that are within a predetermined distance from the sensed position point;
choosing a best snap point candidate from among the reduced set of snap point candidates based on a plurality of predictive variables and corresponding weighting factors for each snap point candidate in the reduced set of snap point candidates; and
snapping the sensed position point to the best snap point candidate to produce a snapped position point, wherein said selecting, said choosing, and said snapping are performed in substantially real time so that said method correlates the sensed position data from the moveable object with terrestrial features in substantially real time.
2. The method of claim 1, further comprising:
displaying the snapped position point and a portion of the terrestrial features on a display system; and
repeating said receiving, said selecting, said choosing, said snapping, and said displaying on subsequent sensed position points so that sequential positions of the moveable object with respect to the portion of the terrestrial features are displayed in substantially real time.

3. The method of claim 1, further comprising establishing the two-dimensional grid before performing said receiving.

4. The method of claim 3, wherein said establishing the two-dimensional grid comprises establishing a two-dimensional grid of squares.

5. The method of claim 4, wherein said defining the search area comprises defining a search area of four grid squares that share the identified vertex.

6. The method of claim 5, wherein the side of each grid square of the two-dimensional grid of squares corresponds to a terrestrial distance of about 91 m (about 300 ft).

7. The method of claim 6, wherein the predetermined distance from the sensed position point corresponds to a terrestrial distance of about 45 m (about 150 ft).

8. The method of claim 1, wherein said choosing comprises:
   determining values of the predictive variables for each snap point candidate in the reduced set of snap point candidates;
   obtaining the weighting factors for the predictive variables;
   calculating a score for each snap point candidate in the reduced set of snap point candidates based on the values of the predictive variables and the corresponding weighting factors; and
   identifying the best snap point candidate based on the calculated score.

9. The method of claim 8, wherein said determining the values of the predictive variables comprises:
   obtaining predictive variable parameters for each snap point candidate in the reduced set of snap point candidates; and
   determining predictive variable parameters for the sensed position point; and
   calculating the value of each predictive variable based on the obtained predictive variable parameters for each snap point candidate in the reduced set of snap point candidates and the predictive variable parameters for the sensed position point.

10. The method of claim 9, further comprising:
    determining the predictive variable parameters for the snap points before performing said receiving;
    storing the corresponding predictive variable values for the snap points in a memory system; and
    wherein said obtaining the predictive variable parameters comprises obtaining the predictive variable parameters from the memory system.

11. The method of claim 1, wherein the predictive variables comprise two or more selected from the group consisting of:
    a distance between the sensed position point and the snap point candidate;
    a difference between a heading angle associated with the sensed position point and a tangent vector associated with the snap point candidate;
    a segment connectivity; and
    a difference between an angle from the previous snapped position point to each of the snap point candidates and the average of the tangent angles at the previous snapped position point and the snap point candidates.

12. The method of claim 8, further comprising:
    calculating the weighting factors before performing said receiving;
    storing the calculated weighting factors in a memory system; and
    wherein said obtaining the weighting factors comprises obtaining the weighting factors from the memory system.

13. The method of claim 12, wherein said calculating the weighting factors comprises:
    creating a training set from a plurality of sensed position points;
    snapping the plurality of sensed position points from the training set using the predictive variables;
    identifying correct snaps and erroneous snaps; and
    applying a logistic regression to the predictive variables to determine the weighting factors for the predictive variables.

14. The method of claim 13, wherein said identifying correct snaps and erroneous snaps comprises:
    identifying as correct snaps all snaps that meet at least one correct snap criterion; and
    identifying as incorrect snaps all snaps that are not correct snaps.

15. The method of claim 1, further comprising pre-processing the terrestrial data before performing said receiving, said pre-processing the terrestrial data comprising:
    creating snap points from raw terrestrial data; and
    assigning a location ID to each snap point.

16. The method of claim 15, wherein the raw terrestrial data comprises a plurality of road segments, wherein each of the plurality of road segments is defined by a Bezier curve having two end points and two control points, and wherein said creating the snap points comprises dividing the Bezier curve for each road segment into a predetermined number of intervals, the predetermined number of intervals defining the snap points.

17. The method of claim 16, wherein said dividing the Bezier curve into a predetermined number of intervals comprises dividing the Bezier curve into intervals corresponding to a terrestrial distance of about 9.1 m (about 30 ft).

18. The method of claim 15, further comprising:
    calculating predictive variable parameters for each snap point; and
    storing the predictive variable parameters for each snap point in a memory system.

19. The method of claim 18, wherein the predictive variable parameters for each snap point comprise one or more selected from the group consisting of a tangent angle, a local road curvature, and an intersection type.

20. The method of claim 16, wherein said pre-processing the terrestrial data further comprises correcting the terrestrial data, said correcting the terrestrial data comprising:
    overlaying the snap points and the sensed position points;
    iteratively varying a plurality of position parameters associated with the snap points and the sensed position points to optimize an overlap of the snap points and sensed position points;
    determining a magnitude of each of the plurality of position parameters; and
    correcting the terrestrial data when the magnitude of at least one of the plurality of position parameters exceeds a threshold value for at least a predetermined time period.

21. The method of claim 20, wherein the position parameters comprises two or more selected from the group consisting of latitude, longitude, and rotation.

22. The method of claim 20, wherein the predetermined time period is 10 days.

23. The method of claim 1, further comprising:
repeating said receiving, said selecting, said choosing, and said snapping to produce a plurality of snapped position points; and
using the plurality of snapped position points to track sequential positions of the moveable object over time.

* * * * *